Feb. 17, 1942. S. P. McDANIELS 2,273,123
CONTROL APPARATUS
Filed Dec. 2, 1939

INVENTOR
S. P. McDANIELS
BY E. R. Nowlan
ATTORNEY

Patented Feb. 17, 1942

2,273,123

UNITED STATES PATENT OFFICE 2,273,123

CONTROL APPARATUS

Shryock P. McDaniels, Maplewood, N. J., assignor to Western Electric Company, Incorporated, New York, N. Y., a corporation of New York Application December 2, 1939, Serial No. 307,249

1 Claim. (Cl. 198—20)

This invention relates to a control apparatus, and more particularly to an apparatus for controlling the movement of articles from one conveyor to another.

In conveyor systems where a plurality of branch conveyors feeds articles to a main conveyor it is frequently desirable to control such feeding of articles for various reasons, such as to maintain the main conveyor at full capacity, to open and close the branch lines in predetermined sequence and to eliminate jamming of the articles.

An object of the invention is to provide a simple, efficient and practicel control apparatus particularly for use in conveyors to control the movement of articles thereon.

With this and other objects in view, the invention comprises a roller-carrying arm normally urged into the path of articles of one conveyor to hold them against movement into another conveyor until a solenoid is operated, to move the arm and its roller out of the path of the articles and allow the roller to bear upon the adjacent sides of the articles.

Figure 1:
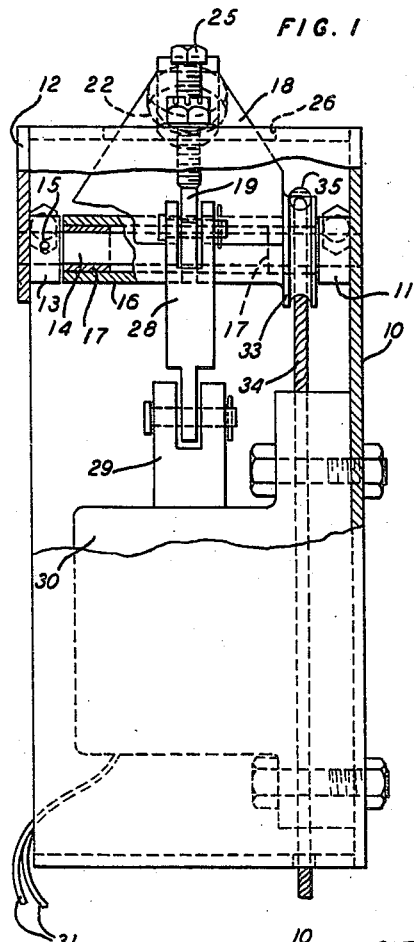
Figure 2:
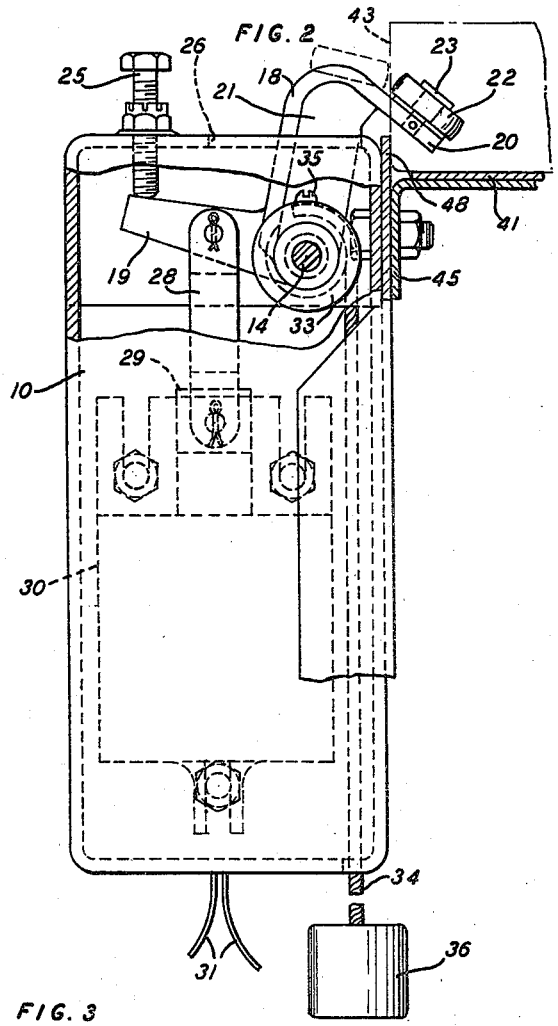
Figure 3:
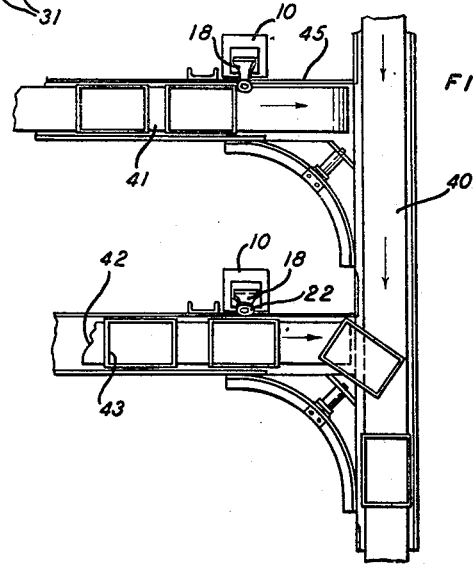

Other objects and advantages will be apparent from the following detailed description when taken in conjunction with the accompanying drawing, wherein Fig. 1 is a rear elevational view of the control apparatus, portions thereof being broken away;

Fig. 2 is a side elevational view of the control apparatus shown associated with a conveyor, and Fig. 3 is a fragmentary top plan view of a conveyor system showing apparatuses of the type shown in Figs. 1 and 2 mounted upon the frames of branch conveyors to control the articles thereon.

Referring now to the drawing, attention is first directed to Figs. 1 and 2, which illustrate a casing 10 having an embossed portion 11 and a cover plate 12 having an embossed portion 13, the embossed portions being apertured to receive the ends of a shaft 14. The shaft is fixed against rotation by a pin 15 extending therethrough and through the embossed portion 13. An element 16, through the aid of bearings 17, is rotatably mounted upon the shaft 14 and has arms 18 and 19 extending outwardly therefrom at different angles, as illustrated in Fig. 2. The arm 18 has a roller-supporting portion 20 reenforced by a rib portion 21. A roller 22 is rotatably mounted upon a pin 23 carried by the portion 20 of the arm and is positioned to extend in front of articles on a conveyor.

The arm 19 extends outwardly a sufficient distance to engage an adjustable stop 25, which in the present instance is in the form of a screw threadedly disposed in an aperture in the casing, to limit the movement of the roller 22 in front of the articles on the conveyor. It will be observed, by viewing Fig. 2, that an aperture 26 in the upper wall of the casing allows movement of the arm 18, which extends therethrough.

A link 28 operatively connects the arm 19 to a core 29 of a solenoid 30, the latter being rigidly mounted in the casing as illustrated in Figs. 1 and 2. The solenoid may be included in any desired control circuit (not shown) through its conductor wires 31, to cause operation of the solenoid at selected intervals to free the articles from a conveyor with which the apparatus is associated. The solenoid functions to move the roller 22 out of the path of the articles on a conveyor and means is provided to normally urge the roller into the path of the articles and to thus hold the roller in such position until the solenoid is operated. This last named means comprises a sheave 33 fixed to the element 16 concentric with the shaft 14 and having one end of a cable 34 fixed thereto as illustrated at 35, the other end of the cable supporting a weight 36 tending to cause clockwise rotation of the shaft 14 (Fig. 2) to move the roller into holding position.

In Fig. 3 a fragmentary portion of a conveyor system is illustrated. In this illustration the main line conveyor 40 has branch conveyors 41 and 42 associated therewith to feed articles, such as trays or baskets 43, thereto. In the present showing the conveyors consist mainly of endless belts suitably supported and driven by mechanism carried by frames 45. The apparatus shown in Figs. 1 and 2 may be secured to the frame 45 of each of the branch conveyors 41 and 42 at any desired position and operated at selected intervals by suitable electrical circuits (not shown) as illustrated in Fig. 2.

In conveying articles such as the trays 43 the articles or trays in the first instance are usually substantially equal in width to the width of the conveyors and the frames of the conveyors usually have side portions as indicated at 48 (Fig. 2) to guide the trays in their advancement on the conveyors. This is true in the present embodiment, that is, the trays 43 are slightly smaller in width than the distance between the vertical side members 48 of the frame 45, allowing the trays to move freely on the conveyors when desired, yet limiting them to definite paths.

Upon considering the operation of the apparatus, let it be assumed that the different apparatuses in connection with the different conveyors are to be operated singly. This may be done, as stated in the foregoing description, by desired electrical circuits for controlling the solenoids. Normally the element 16 is in the position shown in Fig. 2, holding the trays against movement, due to the weight 36 holding the arm 19 against the stop 25. To move the element to free the articles or trays for movement the solenoid is energized, causing the core 29 to move downwardly, moving with it the link 28 and causing rotation of the element 16 about the shaft 14, moving the arm 19 away from the stop a sufficient distance to move the roller 22 out of the paths of the trays and allow it to ride upon the adjacent sides of the trays until the desired number of trays has been allowed to pass. When this has taken place the solenoid 30 is deenergized, freeing the element 16 so that the weight 36, which has previously moved upwardly by the operation of the solenoid, may move downwardly, causing the element to rotate clockwise (Fig. 2) upon the shaft and move the roller 22 into the path of the approaching trays. The roller 22, in riding upon the adjacent surface of the trays, makes possible the deenergization of the solenoid while the roller is engaging the last tray to pass thereby until this tray has moved beyond the roller, allowing the roller to immediately move into the path of the next approaching tray, which movement is caused by the weight 36. This movement of the element 16 by the weight 36 is limited by the stop 25 which is engaged by the arm 19 of the element. The roller 22 not only rides on the sides of the trays passing by the element but it also rides on the front of the tray it engages at the time the solenoid is energized and the back of the tray it engages at the time the solenoid is deenergized, thus providing substantially frictionless means between the element and the trays.

With an apparatus of this type associated with each branch conveyor the trays may be allowed to move from the branch conveyors in predetermined sequence, as illustrated in Fig. 3, or they may be allowed to move from the branch conveyors onto the main conveyor simultaneously in predetermined groups if so desired.

The embodiment of the invention herein disclosed is illustrative and may be modified and departed from in many ways without departing from the spirit and scope of the invention as pointed out in and limited solely by the appended claim.

What is claimed is:

A control apparatus comprising a frame mounted at one side of a conveyor, a shaft supported by the frame, an element mounted for movement on the shaft and having a stop member formed to extend over the side of the conveyor in the path of articles thereon, and an arm extending transversely therefrom, an adjustable stop in the path of the arm to vary the extent of movement of the element in moving the stop member in front of the articles on the conveyor, a drum mounted upon the shaft and fixed to the element, a weighted cable fixed to the drum to be wound thereon upon movement of the element out of stopping position and to cause movement of the element into stopping position, and a solenoid connected to the arm of the element to move the element against the force of the weighted cable to free the articles for movement on the conveyor.

SHRYOCK P. McDANIELS.